3,272,632
PROCESS FOR CONVERTING OFFAL
AND FEATHERS
Paul Speer, 11048 Candlelight Lane, Dallas 29, Tex.
Filed Nov. 6, 1961, Ser. No. 150,569
15 Claims. (Cl. 99—2)

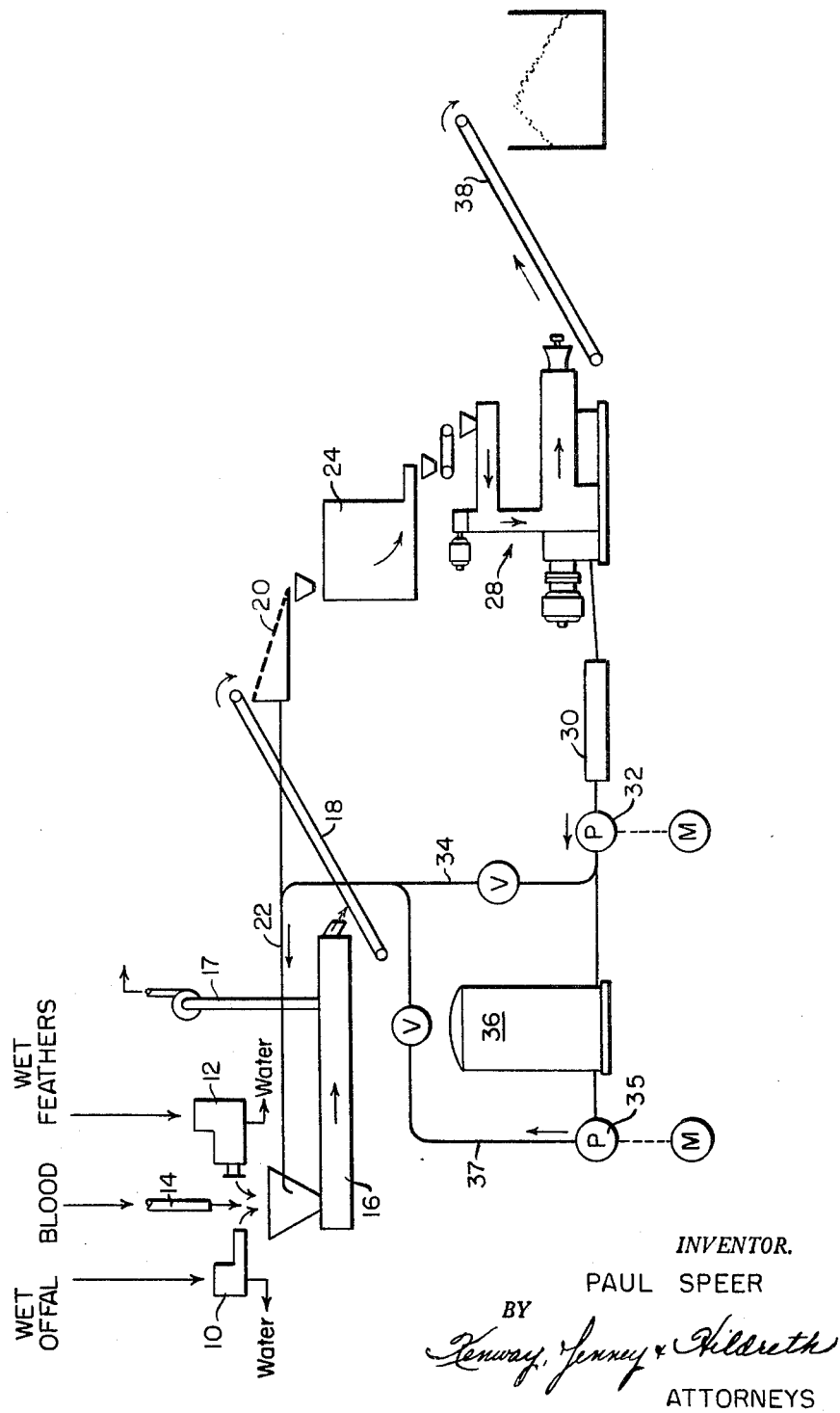

This invention relates to a novel and improved process for converting poultry feathers and offal into a usable product.

It has long been known that waste organic materials can be converted into a usable nutritious product by hydrolizing the waste at atmospheric pressure or above by contacting the material with steam heat. In this manner, waste materials such as waste products from meat processing plants, garbage, edible fats, edible bones, agricultural wastes, etc. can be converted into animal feeds or fertilizers. This hydrolizing treatment has also been applied to the wastes of the poultry slaughtering industry with varying degrees of success. One of the problems in the poultry slaughtering industry is that of converting the feathers to a usable product. It has been proposed to use a process similar to that utilized in the conversion of offal. Such a process is described in United States Patent No. 2,702,245 issued Feb. 15, 1955. However, the processing of feathers in this manner requires high pressures, and further requires a very long treatment time. Also, the processing of the feathers is usually carried on separately from that of the processing of the offal which requires a different processing time. Because of these complexities, the majority of poultry offal and feather processing is carried on by independent concerns or processing plants, separate from the slaughtering plants. The offal and feathers are stored by the slaughtering plant and are picked up periodically by the processing plant. The blood resulting from the slaughtering operation is usually wasted, however, inasmuch as the slaughtering plants do not have facilities for storing the blood and it is difficult to transport to the processing plant. Accordingly, the blood is normally washed down the sewer where it may present health and sewage treatment problems.

It is the primary object of the present invention to provide a novel and improved process for converting poultry offal including blood and feathers into a usable nutrient product, which process will not require the use of super atmospheric pressures with the attendant advantages of eliminating costly complex pressure vessels and of permitting continuous rather than batch processing of the waste product.

It is a further object of the present invention to provide a novel and improved process of the type described which is practical for a poultry slaughtering plant to practice, thus enabling the slaughtering plant to realize an economic advantage through the sale of a secondary product while at the same time eliminating its waste disposal problem.

It is further a particular object of the present invention to provide a novel and improved process of the type described by which poultry offal, blood and feathers may be treated simultaneously by the same process to provide an end product which is superior in quality to products resulting solely from the conversion of feathers or solely from the conversion of offal.

The objects of my invention are achieved in a process characterized by the conversion of the waste products by contacting the same with oil at atmospheric pressures and for a time and at a temperature sufficient to dehydrate the waste to a desired moisture content while at the same time denaturing, cooking and sterilizing the waste. Subsequently, at least a portion of the oil content of the waste is removed to provide a substantially dry product having the desired amount of fat content. It should be clearly understood that the converting of the waste by contact with hot oil is not accomplished in addition to the usual hydrolizing step but rather is substituted for this step. Accordingly, I eliminate the need for any pressure vessels and provide a process which is adaptable to continuous operation rather than the batch processing necessitated by the high pressure method.

A more detailed understanding of my invention will be had with reference to the following specific description of the process when taken in connection with the accompanying drawing which diagrammatically depicts an illustrative installation for practicing the continuous process of this invention. While my process may be used for the converting of poultry offal, blood or feathers independently of one another, it has the distinct advantage of permitting the simultaneous treatment of these wastes as they are collected in the slaughterhouse. This provides the attendant advantage that the resulting product will comprise a mixture of the converted wastes in approximately the same proportion as the wastes originally existed in the fowl. In this manner, a higher protein more balanced feed may be obtained than in the case of feed consisting only of converted offal or only of converted feathers. The wet offal comprising heads, feet and innards are conveyed by suitable means from the slaughtering operation to a grinder or chopper 10. Simultaneously, wet feathers from the slaughtering plant are conveyed to a chopper or grinder 12. If desired, only one grinder may be used for both the offal and feathers. The blood resulting from the slaughtering operation is pumped from the drain trough or collection tank to a conduit 14.

While the wet offal and feathers are preferably ground or chopped before they are introduced into the oil, this chopping operation is not absolutely essential. However, it is advantageous in that it assists in removing surplus water in the waste so as to make the waste easier to convey while at the same time it reduces the amount of dehydration necessary in the hot oil treatment step. It should be noted that it is not necessary to reduce the feathers and offal to a very fine particle size. Rather, I merely chop these wastes to a size to meet various requirements of the finished product. The chopper or grinder also preferably includes means for removing surplus or excess water which has accumulated during the slaughtering process. This excess water includes water in combination with the waste as well as water absorbed by the waste. After chopping and dewatering, the offal and feathers together with the blood are deposited in a cooker 16 containing hot oil. The wastes are conveyed through the cooker 16 by suitable means and at a preselected speed until they are deposited on a conveyer 18. It will be understood that the cooker 16 may be of any suitable configuration and is not a pressure cooker, but rather the pressure within the cooking container is atmospheric pressure. The cooker may be closed for convenience and removal of water vapor, and an exhaust duct 17 may be provided for exhausting vapors to atmosphere.

An example of a suitable cooker is a vessel for containing the oil and having conveyer vanes of the screw type for advancing the particles through the vessel. The conveyer may also include heating coils for controlling the temperature of the oil. When the waste is dropped into the oil some of the product will float and some will gradually work to the bottom of the tank. All of the particles will, however, be advanced by the conveyer to prevent over cooking.

When treating feathers, the temperature of the oil is usually approximately 300° F., but in any event should be in excess of 212° F. in order to provide sterilization where the product is to be used as a feed. The temperature of the oil is determined by the time and temperature relationship necessary to satisfactorily convert the feathers to a product having the desired percentage of digestibility and desired dehydration. It has been found, as an illustration, that where feathers are treated in tallow at a temperature of approximately 300–315° F., a time of treatment of approximately fifteen minutes is sufficient to satisfactorily convert the feathers to a usable product. In this connection, it should be noted that this is a considerably less treatment time than required for the conversion of feathers by the high pressure method which can require as long as from three to eight hours. One of the characteristics of this invention with respect to the conversion of feathers is that the feathers are "popped" during the hot oil treatment much in the nature of popcorn or pork skins are popped although the feathers may not be everted in the same manner as popcorn. Where the temperature of the oil is reduced substantially below 300° F. this popping is not so pronounced and although dehydration is complete, the percent of digestibility of the end product is reduced. Accordingly, when feathers are processed alone or in conjunction with other waste products, the time and temperature relationship should be adjusted to obtain the desired popping of the feather substantially immediately upon their entrance into the hot oil or at least very shortly thereafter. In this manner, the feathers are more easily dehydrated during the remainder of the treatment time.

Where only offal or blood is being processed, the oil temperature may be reduced, although it should not be reduced below 212° F. where sterilization of the product may be necessary or desired. Again, the time and temperature relationship of the process should be adjusted to achieve the desired degree of dehydration and denaturing of the product in the oil bath. The type of oil utilized can be either animal, vegetable or mineral. Where the resultant product is to be used as a food product, the oil utilized should, of course, be edible. Also, the oil should be selected so that the operation temperature of the oil bath is below ignition and decomposition temperature of the oil. The term "oil" as used herein includes materials which are solid, for example, at room temperature but which are liquid at the temperatures of the treatment.

The converted wastes are carried by the conveyer 18 to a fluid screen 20 by means of which readily removable excess oils are drained from the wastes and conveyed by a pipe 22 back to the oil cooker 16. The wastes when reaching the screen 20 may include as much as 50% by volume of oil. The drawing of the oil in the screen should reduce the oil to about 35%. The wastes passed over the fluid screen 20 are deposited in a surge storage bin 24. The wastes are removed from the storage bin 24 by suitable means and deposited on a magnetic conveyer 26 for the removal of any ferromagnetic refuse such as wire, staples, etc, which may have come inadvertently mixed with the waste during the slaughtering operation.

The wastes are then deposited in a press 28 which removes excess oil and fats from the waste. It is preferred that the oil content be reduced about 22% or less by weight of the product. Where the oil content is higher than 22%, the product is difficult to handle. The oil content can be controlled by mechanical pressing to about 8% or as low as 3–4% by means of solvent extraction. The oil content may vary depending on the desired end use of the product. In the case where the product is to be used as a protein feed, the oil content may be reduced to approximately 8–15% which is a common fat analysis range for feed. The oils and fats removed from the wastes are deposited in an oil sump 30 and conveyed by a pump 32 through a conduit 34 back to the conduit 22 leading to the oil cooker. Where the rate of oil and fat removal by the press is in excess of that necessary to provide makeup oil in the oil cooker, the surplus oils are conveyed to an oil storage tank 36. The tank 36 is preferably heated to preheat the oil for subsequent use in the cooker. The oil in the tank 36 is removed therefrom by a pump 35 through a conduit 37. Suitable valving is provided in the conduits 34 to 37 to achieve the desired adjustment in the return flow of oil to the cooker. Where the poultry process is high in waste fat, the process will be more than self-sustaining with regard to the oil used in the cooker. The surplus oil may be stored for subsequent clarification and sale as inedible oils for industry. Where the fat content of the waste is not so high, the oils removed may or may not be sufficient to provide makeup oil for the cooker. In any event, the availability of any oil and fat from the waste materials themselves as makeup oil for the cooker enhances the economics of the process.

The wastes discharged from the press onto a conveyer 38 leading either to storage or the dry end product or, if desired, to suitable means for packaging the product. A moisture content at the end of the process should be 15% or less by weight of the product. Some regulations require that the moisture content be no greater than 8% in the case of protein feed. In any event, the moisture content should be sufficiently low to eliminate souring of the product during storage and to render the product easy to handle. The desired dehydration of the waste occurs in the oil cooking step and only minor amounts of moisture, if any, is removed in the press 28. Accordingly, where the moisture content of the end product is higher than desirable, the time-temperature relationship of the oil cooking step should be adjusted to reduce the moisture of the end product. However, if desired, a blend of some material of a lower moisture content could be added to the end product to produce the desired moisture content of the overall mix.

The digestibility of the end product is particularly good; for example, when a combination of offal and feathers in the approximate proportions normally found in poultry were processed as described above in tallow for fifteen minutes, at a temperature of approximately 315° F., the digestibility of the end product prior to final processing was approximately 82.7% with protein 60.78%, fat 31.05% and moisture 0.34%. The digestibility was determined by a conventional pepsin-hydrochloric acid test. This percentage digestibility indicates a high percentage of protein available in the end product which makes it particularly attractive for use as animal feed or a fertilizer. In this connection, it is believed that the digestibility should normally be at least about 70%.

While the process has been described as a continuous one, it will of course be apparent to those skilled in the art that it could be operated on a batch basis if desired. The equipment particularly with regard to the choppers 10 and 12 and the press 28 may be conventional readily available equipment. Thus, it will be seen that the installation necessary for practicing this process may be easily set up in or adjacent to a poultry slaughtering plant with the process being conducted as a normal adjunct to the slaughtering operation. The value of the end product will very materially offset the cost of installation and processing so that not only with the process eliminate the waste disposal problem of the slaughtering plant but will provide substantial additional source of revenue.

Inasmuch as variations and modifications could be made in the specific process described above and in the end use of the product, it is to be understood that the foregoing description is to be taken only in an illustrative sense and not as limiting the scope of the invention. Rather, the scope of my invention is intended to be limited only by the appended claims which are intended to cover all of the general and specific features of the invention herein described and all statements of the scope of the invention which, as a matter of language, might be said to fall therebetween.

Having described my invention, I claim:

1. A process for converting poultry wastes consisting essentially of offal, blood and feathers into a nutritious product comprising the steps of contacting the waste with hot oil for a time and at a temperature above 300° F. sufficient to dehydrate, and cook the waste, the oil treatment step being conducted at atmospheric pressure, and at least partially removing the oil from the waste.

2. A process for converting feathers to change the composition thereof and render the protein in the feathers more readily available comprising cooking feathers in hot oil at atmospheric pressure under time and temperature conditions resulting in popping of the feathers and at least partial dehydration thereof, the temperature of the oil being below ignition and decomposition temperatures of the oil, and substantially effecting at least partial removal of oil from the feathers.

3. The process described in claim 2 in which the feathers are maintained in contact with the hot oil for approximately fifteen minutes.

4. The process described in claim 2 in which the feathers are maintained in the hot oil for a time sufficient to reduce the water content of the feathers to no greater than approximately 15% by weight.

5. The process described in claim 2 in which the feathers are maintained in the hot oil for a time sufficient to provide the feathers with a pepsin-hydrochloric acid digestibility of at least 70%.

6. A process for converting poultry waste consisting of feathers and other waste such as offal and blood into a nutritious product comprising the steps of depositing the feathers and other waste simultaneously into a bath of hot oil at atmospheric pressure, maintaining the oil at a temperature sufficient to pop the feathers, retaining the feathers and other waste in the hot oil for a time sufficient to effect cooking and at least partially to dehydrate the same, removing the converted feathers and other waste from the hot oil, and effecting at least partial removal of oil from the converted feathers and other waste.

7. The process described in claim 6 in which the feathers and other waste are introduced into the hot oil in approximately the same proportions that they are found in the original poultry.

8. The process described in claim 6 in which the feathers and other waste are maintained in the oil for a time sufficient to effect dehydration thereof to a water content of no greater than approximately 15%.

9. The process described in claim 6 in which the feathers and other waste ar emaintained in the hot oil for a time sufficient to provide a pepsin-hydrochloric digestibility of at least 70%.

10. The process described in claim 6 in which the oil temperature is sufficient to effect popping of the feathers substantially as soon as they are contacted with the oil.

11. The process described in claim 6 in which the feathers and other waste are initially wet and are reduced in size and surplus water is removed therefrom prior to their being introduced into hot oil.

12. The process described in claim 6 in which the oil removed from the waste is used as makeup oil for the oil bath.

13. A process for converting poultry waste consisting essentially of feathers and other waste such as offal and blood into a useable proteinaceous product which process comprises: chopping the poultry waste to a predetermined particle size; removing excess water from the chopped waste; cooking the chopped dewatered waste in an edible hot oil at atmospheric pressure for a period of time sufficient to pop the feathers and to at least partially dehydrate the same; removing the converted waste from the hot oil; pressing the converted waste to reduce the oil content to about 22 weight percent or less; and recovering the converted waste product which product is characterized by a pepsin-hydrochloric digestibility of at least 70 percent.

14. The process described in claim 6 wherein the partial removal of the oil from the converted feathers is effected by pressing methods.

15. The process described in claim 6 wherein the partial removal of the oil from the converted feathers is effected by solvent extraction methods.

References Cited by the Examiner

UNITED STATES PATENTS

| | | | |
|---|---|---|---|
| 2,474,339 | 6/1949 | Ward et al. | 99—7 X |
| 2,702,245 | 2/1955 | Mayer | 99—2 |
| 2,996,383 | 8/1961 | Gershon | 99—7 |
| 3,071,468 | 1/1963 | Docken | 99—9 |
| 3,076,715 | 2/1963 | Greenfield | 99—208 |

FOREIGN PATENTS 411,584  6/1934  Great Britain.

A. LOUIS MONACELL, *Primary Examiner.*

D. J. DONOVAN, *Assistant Examiner.*